United States Patent Office 2,763,647
Patented Sept. 18, 1956

2,763,647
TOLUIC ACID DERIVATIVES AND METHODS FOR THEIR PREPARATION

Sidney R. Safir, River Edge, N. J., Joseph J. Hlavka, Nanuet, N. Y., and James H. Williams, Ridgewood, N. J., assignors to American Cyanamid Company, New York, N. Y., a corporation of Maine No Drawing. Application February 1, 1954, Serial No. 407,601

13 Claims. (Cl. 260—247.2)

This invention relates to a new class of organic compounds, and more particularly, to α-(N-carbobenzyloxy-N-carboxymethylamino)-α-toluic acid, certain derivatives thereof and their methods of manufacture.

Among the objects and advantages of the present invention are novel processes for producing the new compound α-(N-carbobenzyloxy-N-carboxymethylamino)-α-toluic acid and the anhydride and monoamide derivatives thereof, the monoamide being useful as intermediates for the manufacture of other organic compounds, the acid and anhydride serving as intermediates for the monoamides. For example, $N^4$ carbobenzyloxy substituted 3-phenyl-2,6-piperazinedione, may be conveniently prepared by subjecting the monoamides of this invention to proper dehydrating conditions, to effect ring closure by the removal of the elements of water. This compound is an anaesthetic agent, suitable for intravenous administration. Its preparation and that of other useful $N^4$ substituted 3-phenyl-2,6-piperazinediones constitute the subject matter of U. S. application, S. N. 407,602, filed concurrently herewith by Safir et al.

The compounds with which this invention is particularly concerned may be represented by the following general formula:

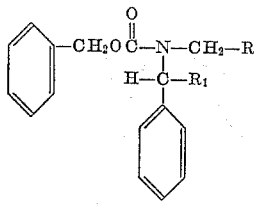

wherein R and $R_1$ are, interchangeably, members selected from the group consisting of carboxyl and carboxamido radicals, and when taken together comprise the di-(oxy)-carbonyl radical. Thus where R and $R_1$ are both carboxyl radicals, the compound is α-(N-carbobenzyloxy-N-carboxymethylamino)-α-toluic acid:

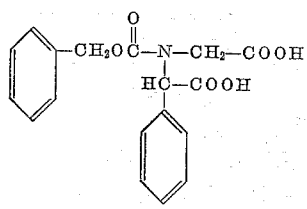

Where the elements of water from the two carboxylic radicals are removed by dehydration, the corresponding anhydride results as follows:

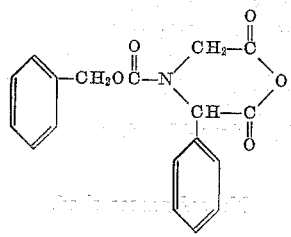

Further, R may be a carboxamide function, and $R_1$ may be a carboxyl radical

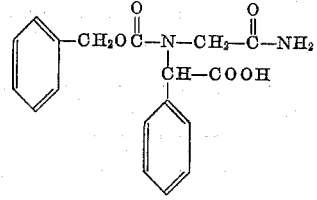

which represents α-(N-carbobenzyloxy-N-carboxamidomethylamino)-toluic acid. When, on the other hand, R is a carboxyl radical and $R_1$ is a carboxamido function, we have the following compound:

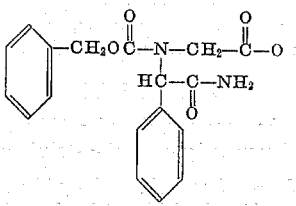

which represents α-(N-carbobenzyloxy-N-carboxymethylamino)-toluamide.

In general, the toluic acid compounds of the invention may be prepared by reacting the known α-(carboxymethylamino)-α-toluic acid with active halogen compounds such as esters of chloroformic acid, benzyl halides or allyl halides to yield the corresponding N-substituted diacids. Benzyl chlorocarbonate is the preferred compound to be employed for this purpose although others may be equally suitable, such as for example α- or β-napthylmethyl chloroformate, benzylhydryl chloroformate, diphenylmethyl chloroformate, benzyl bromide, allyl bromide, benzyl chloride, and allyl chloride.

Once the N-substituted di-acid is obtained it may be readily converted to the inner anhydride upon treatment with a suitable dehydrating agent such as acetic anhydride. Other known compounds may however be suitably used to effect the dehydration such as phosphorus oxychloride or thionyl chloride. Finally, rupture of the anhydride linkage to obtain the isomeric monoamides may be conveniently accomplished by treatment with ammonia or a primary amine.

Reaction conditions such as time and temperature during the preparation of the compounds of this invention are variable factors which are dependent upon the nature of the compound being prepared. During the reaction of α-(carboxymethylamino)-α-toluic acid with benzyl chlorocarbonate the temperature may be varied from —5° to 35° C., the preferred temperature range being 0°–20° C. Conversion of the resulting compound to the inner anhydride is effected by treatment with a dehydrating agent on a steam bath for a period of 3 to 5 hours. Preparation of the monoamide from the iner anhydride proceeds smoothly at temperatures varying between —10° C. and 40° C.

In more specific detail, the following examples illustrate the invention:

EXAMPLE I

*Preparation of α-(N-carbobenzyloxy-N-carboxymethylamino)-α-toluic acid*

2.1 gms. of α-(carboxymethylamino)-α-toluic acid were dissolved in 10 ml. of 2 N aqueous sodium hydroxide. The resulting solution was kept at 0–5° C. and agitated vigorously during the simultaneous drop-wise addition of 1.9 gms. of 90% benzyl chlorocarbonate and 11 ml. of 1 N aqueous sodium hydroxide. During this addition, preferably lasting about 25 minutes, the pH was kept at between 9.5 and 10.5. The reaction mixture was extracted once with 25 ml. of ether, and the aqueous residue acidified with 3.5 ml. of 6 N aqueous hydrochloric acid. A white gum separated from solution which crystallized on scratching. The solid was filtered and washed with water yielding 3.0 gms. of product melting with gas evolution at 168–171° C. The material was recrystallized by dissolving in hot ethyl acetate, concentrating and adding benzene. A sample of the recrystallized α-(N-carbobenzyloxy-N-carboxymethylamino)-α-toluic acid melted at 170–172° C. with gas evolution.

EXAMPLE II

*Preparation of α-(N-carbobenzyloxy-N-carboxymethylamino)-α-toluic acid anhydride*

A mixture of 18.5 gms. of α-(N-carbobenzyloxy-N-carboxymethylamino)-α-toluic acid and 120 ml. of acetic anhydride was heated on a steam bath for 4 hours, the mixture was evaporated under vacuum to yield α-(N-carbobenzyloxy-N-carboxymethylamino) - α - toluic acid anhydride, an amber gum weighing 17.7 gms.

EXAMPLE III

*Preparation of the monoamide of α-(N-carbobenzyloxy-N-carboxymethylamino)-α-toluic acid*

60 gms. of α-(N-carbobenzyloxy-N-carboxymethylamino)-α-toluic acid anhydride, 120 ml. of 15 N aqueous ammonia, and 180 ml. of water were mixed together. Solution was effected by means of vigorous agitation, during which time the temperature rose to 30–35° C. The mixture was filtered, and the filtrate was washed once with ether and then acidified with an excess of 6 N aqueous hydrochloric acid. The gum which precipitated was extracted with 500 ml. of ethyl acetate. The ethyl acetate extract was cooled to 0° C. and stirred for several hours, during which time the product crystallized from solution. The crystals, when filtered off, weighed approximately 31.8 gms. and melted at 158–165° C. On recrystallization from methanol, the yield of the purified product— namely, the monoamide of α-(N-carbobenzyloxy-N-carboxymethylamino)-α-toluic acid was 25.2 gms. melting at 166–169° C. The filtrate yielded the isomeric-amide.

We claim:

1. A compound having the general formula:

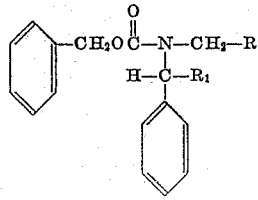

wherein R and $R_1$ are, interchangeably, members selected from the group consisting of carboxyl and carboxamido radicals, and when taken together comprise the di-(oxy)-carbonyl radical.

2. α-(N-carbobenzyloxy - N - carboxymethylamino)-α-toluic acid.

3. α-(N-carbobenzyloxy - N - carboxymethylamino)-α-toluic acid anhydride.

4. α-(N-carbobenzyloxy-N-carboxamidomethylamino)-toluic acid.

5. α-(N - carbobenzyloxy - N - carboxymethylamino)-toluamide.

6. A process for preparing compounds having the general formula:

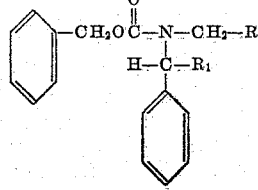

wherein R and $R_1$ are, interchangeably, members selected from the group consisting of carboxyl and carboxamido radicals and, when taken together comprise the di-(oxy)-carbonyl radical which comprises reacting α-(carboxymethylamino)-α-toluic acid with benzyl chlorocarbonate at a temperature ranging from —5° to 35° C. to produce α-(N-carbobenzyloxy - N - carboxymethylamino)-α-toluic acid, treating said compound with a dehydrating agent to obtain α-(N-carbobenzyloxy-N-carboxymethylamino)-α-toluic acid anhydride, treating said compound with ammonia, filtering, acidifying the filtrate with a mineral acid, crystallizing and purifying the resultant precipitate.

7. A process as set forth in claim 5, in which the dehydrating agent is a member of the group consisting of acetic anhydride phosphorus oxychloride and thionyl chloride.

8. A proces as set forth in claim 5, in which the temperature range is from 0° to 20° C.

9. A process for preparing compounds having the general formula:

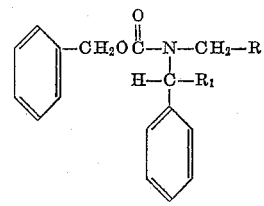

wherein R and $R_1$ are, interchangeably, members selected from the group consisting of carboxyl and carboxamido radicals, and when taken together comprise the di-(oxy)-carbonyl radical which comprises reacting α-(carboxymethylamino)-α-toluic acid with benzyl chlorocarbonate at a temperature ranging from —5° to 35° C. to produce α-(N-carbobenzyloxy - N - carboxymethylamino)-α-toluic acid.

10. A process for preparing compounds having the general formula:

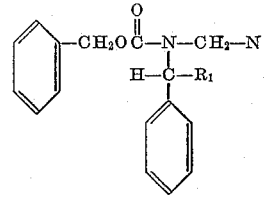

wherein R and $R_1$ are, interchangeably, members selected from the group consisting of carboxyl and carboxamido radicals and, when taken together comprise the di-(oxy)-carbonyl radicals which comprises reacting α-(carboxymethylamino)-α-toluic acid with benzyl chlorocarbonate at a temperature ranging from —5° to 35° C. to produce α-(N-carbobenzyloxy - N - carboxymethylamino)-α-toluic acid, treating said compound with a dehydrating agent to obtain α-(N-carbobenzyloxy-N-carboxymethylamino)-α-toluic acid anhydride.

11. The process which comprises reacting α-(carboxymethylamino)-α-toluic acid with benzyl chlorocarbonate to produce α - (N-carbobenzyloxy - N - carboxymethylamino)-α-toluic acid.

12. The process which comprises reacting α-(N-carbobenzyloxy-N-carboxymethylamino) - α - toluic acid with acetic anhydride to produce α-(N-carbobenzyloxy-N-carboxymethyl-amino)-α-toluic acid anhydride.

13. The process which comprises reacting α-(N-carbobenzyloxy-N-carboxymethylamino)-α-toluic acid anhydride with aqueous ammonia to produce the monoamide of α-(N-carbobenzyloxy-N-carboxymethylamino)-α-toluic acid.

No references cited.